United States Patent
Borgendale et al.

(10) Patent No.: US 8,695,015 B2
(45) Date of Patent: Apr. 8, 2014

(54) APPLICATION MESSAGE CONVERSION USING A FEED ADAPTER

(75) Inventors: Kenneth W. Borgendale, Austin, TX (US); John J. Duigenan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1750 days.

(21) Appl. No.: 11/567,357

(22) Filed: Dec. 6, 2006

(65) Prior Publication Data

US 2008/0141272 A1    Jun. 12, 2008

(51) Int. Cl.
G06F 3/00      (2006.01)
G06F 9/44      (2006.01)
G06F 9/46      (2006.01)
G06F 13/00     (2006.01)

(52) U.S. Cl.
USPC .......................... 719/313; 709/205; 709/206

(58) Field of Classification Search
None
See application file for complete search history.

(56) References Cited

U.S. PATENT DOCUMENTS

| | | |
|---|---|---|
| 4,787,035 A | 11/1988 | Bourne |
| 4,947,429 A | 8/1990 | Bestler et al. |
| 5,195,092 A | 3/1993 | Wilson et al. |
| 5,732,274 A | 3/1998 | O'Neil |
| 5,809,028 A | 9/1998 | Nethercott et al. |
| 5,809,337 A | 9/1998 | Hannah et al. |
| 5,940,843 A | 8/1999 | Zucknovich et al. |
| 5,987,432 A | 11/1999 | Zusman et al. |
| 6,125,391 A | 9/2000 | Meltzer et al. |
| 6,141,324 A | 10/2000 | Abbott et al. |
| 6,160,874 A | 12/2000 | Dickerman et al. |
| 6,694,316 B1 | 2/2004 | Langseth et al. |
| 6,725,446 B1 | 4/2004 | Hahn et al. |
| 6,757,710 B2 | 6/2004 | Reed |

(Continued)

FOREIGN PATENT DOCUMENTS

| | | |
|---|---|---|
| EP | 1 039 410 A | 9/2000 |
| EP | 2007/055851 | 6/2007 |
| WO | WO9900753 A1 | 1/1999 |
| WO | WO 2005/045670 A | 5/2005 |

OTHER PUBLICATIONS

Neville, Jennifer et al. "Using relational knowledge discovery to prevent securities fraud." Proceedings of the eleventh ACM SIGKDD international conference on Knowledge discovery in data mining. Aug. 2005. ACM Press. 449-458.
Office Action Dated Dec. 10, 2009 in U.S. Appl. No. 11/426,849.

(Continued)

Primary Examiner — H S Sough
Assistant Examiner — Kimberly Jordan
(74) Attorney, Agent, or Firm — DeLizio Gilliam, PLLC

(57) ABSTRACT

An indication of a configuration policy of a plurality of configuration policies is received at a feed adapter. The configuration policy of the plurality of configuration policies is selected based, at least in part, on the received indication of the configuration policy. The configuration policy of the plurality of configuration policies specifies a conversion rule from an input message format to an output message format using at least one conversion function of a plurality of conversion functions. The conversion rule specifies types of arguments that the at least one conversion function receives and returns. An application message having the input message format is received in the feed adapter. The feed adapter converts the application message having the input message format to an application message having the output message format according to the conversion rule specified by the configuration policy of the plurality of configuration policies.

19 Claims, 5 Drawing Sheets

(56) References Cited

U.S. PATENT DOCUMENTS

| | | | |
|---|---|---|---|
| 6,901,428 B1 | 5/2005 | Frazier et al. | |
| 6,910,078 B1 | 6/2005 | Raman et al. | |
| 6,954,454 B1 | 10/2005 | Schuster et al. | |
| 7,113,520 B1 | 9/2006 | Meenan | |
| 7,120,165 B2 | 10/2006 | Kasvand-Harris et al. | |
| 7,225,195 B2 | 5/2007 | Avrahami et al. | |
| 7,283,904 B2 | 10/2007 | Benjamin et al. | |
| 7,415,715 B2 | 8/2008 | Fradkov et al. | |
| 7,448,043 B2 | 11/2008 | Shenfield et al. | |
| 2001/0016783 A1 | 8/2001 | Graumann et al. | |
| 2001/0049743 A1* | 12/2001 | Phippen et al. | 709/237 |
| 2002/0019812 A1 | 2/2002 | Board et al. | |
| 2002/0022952 A1 | 2/2002 | Zager et al. | |
| 2002/0023040 A1* | 2/2002 | Gilman et al. | 705/37 |
| 2002/0083097 A1 | 6/2002 | Warrington | |
| 2002/0086688 A1 | 7/2002 | Kang | |
| 2002/0161900 A1 | 10/2002 | Brown et al. | |
| 2002/0169706 A1 | 11/2002 | Chandra et al. | |
| 2002/0172155 A1 | 11/2002 | Kasvand-Harris et al. | |
| 2003/0073406 A1 | 4/2003 | Benjamin et al. | |
| 2003/0115291 A1 | 6/2003 | Kendall et al. | |
| 2003/0115548 A1 | 6/2003 | Melgar | |
| 2003/0158805 A1 | 8/2003 | Mozhdehi | |
| 2003/0204719 A1 | 10/2003 | Ben-Itzhak | |
| 2004/0024753 A1 | 2/2004 | Chane et al. | |
| 2004/0024845 A1 | 2/2004 | Fishhaut et al. | |
| 2004/0034591 A1 | 2/2004 | Wailbroeck et al. | |
| 2004/0148357 A1 | 7/2004 | Corrigan et al. | |
| 2004/0190459 A1 | 9/2004 | Ueda et al. | |
| 2004/0193703 A1 | 9/2004 | Loewy et al. | |
| 2004/0199524 A1 | 10/2004 | Rys et al. | |
| 2004/0205439 A1 | 10/2004 | Carmeli et al. | |
| 2004/0216135 A1 | 10/2004 | Heimbeck | |
| 2005/0010311 A1 | 1/2005 | Barbazette et al. | |
| 2005/0028195 A1 | 2/2005 | Feinleib et al. | |
| 2005/0028208 A1 | 2/2005 | Ellis et al. | |
| 2005/0044197 A1 | 2/2005 | Lai | |
| 2005/0102218 A1 | 5/2005 | Sargent et al. | |
| 2005/0105533 A1 | 5/2005 | Malolepsy et al. | |
| 2005/0149543 A1 | 7/2005 | Cohen et al. | |
| 2005/0195820 A1 | 9/2005 | Betts et al. | |
| 2005/0222931 A1 | 10/2005 | Mamou et al. | |
| 2005/0246186 A1 | 11/2005 | Nikolov | |
| 2005/0246423 A1 | 11/2005 | Starbuck et al. | |
| 2005/0254508 A1 | 11/2005 | Aksu et al. | |
| 2005/0261923 A1 | 11/2005 | Brown et al. | |
| 2005/0262025 A1 | 11/2005 | Wajih et al. | |
| 2005/0273408 A1 | 12/2005 | Bandman et al. | |
| 2006/0085507 A1 | 4/2006 | Zhao et al. | |
| 2006/0143307 A1* | 6/2006 | Codignotto | 709/246 |
| 2006/0149840 A1 | 7/2006 | Thompson et al. | |
| 2006/0206440 A1 | 9/2006 | Anderson et al. | |
| 2006/0242240 A1 | 10/2006 | Parker et al. | |
| 2006/0269148 A1 | 11/2006 | Farber et al. | |
| 2007/0038543 A1 | 2/2007 | Weinstein | |
| 2007/0038712 A1* | 2/2007 | Affronti et al. | 709/206 |
| 2007/0073907 A1 | 3/2007 | Factor et al. | |
| 2007/0091789 A1 | 4/2007 | Thukral | |
| 2007/0106813 A1 | 5/2007 | Bordes et al. | |
| 2007/0150918 A1 | 6/2007 | Carpenter et al. | |
| 2007/0233728 A1 | 10/2007 | Puteick et al. | |
| 2007/0271447 A1 | 11/2007 | Agarwala et al. | |
| 2007/0299936 A1 | 12/2007 | Borgendale et al. | |
| 2007/0299973 A1 | 12/2007 | Borgendale et al. | |
| 2007/0300233 A1 | 12/2007 | Bhogal et al. | |
| 2007/0300234 A1 | 12/2007 | Dekel et al. | |
| 2007/0300235 A1 | 12/2007 | Dekel et al. | |
| 2008/0010487 A1 | 1/2008 | Dekel et al. | |
| 2008/0069141 A1 | 3/2008 | Bonaguro et al. | |
| 2008/0103949 A1 | 5/2008 | Lobana et al. | |
| 2008/0104266 A1 | 5/2008 | Dekel et al. | |
| 2008/0114839 A1 | 5/2008 | Borgendale et al. | |
| 2008/0114938 A1 | 5/2008 | Borgendale et al. | |
| 2008/0137830 A1 | 6/2008 | Bhogal et al. | |
| 2008/0140550 A1 | 6/2008 | Berezuk et al. | |
| 2008/0141272 A1 | 6/2008 | Borgendale et al. | |
| 2008/0141273 A1 | 6/2008 | Borgendale et al. | |
| 2008/0141275 A1 | 6/2008 | Borgendale et al. | |
| 2008/0141276 A1 | 6/2008 | Borgendale et al. | |
| 2008/0243675 A1 | 10/2008 | Parsons et al. | |
| 2008/0244017 A1 | 10/2008 | Gershinsky et al. | |
| 2009/0006559 A1 | 1/2009 | Bhogal et al. | |
| 2009/0006560 A1 | 1/2009 | Bhogal et al. | |
| 2009/0024498 A1 | 1/2009 | Berezuk et al. | |

OTHER PUBLICATIONS

Office Action Dated Aug. 18, 2009 in U.S. Appl. No. 11/609,566.
Office Action Dated Jan. 22, 2010 in U.S. Appl. No. 11/609,604.
Final Office Action Dated Aug. 14, 2009 in U.S. Appl. No. 11/567,898.
Office Action Dated Aug. 28, 2009 in U.S. Appl. No. 11/426,789.
Final Office Action Dated Dec. 2, 2009 in U.S. Appl. No. 11/426,864.
Final Office Action Dated Apr. 17, 2009 in U.S. Appl. No. 11/780,826.
"PCQuote.com Releases PCQuote Oribit", PR Newswire, New York: Nov. 2, 1999. p. 1.
"FirstQuote Provides Financial Information Services for Brokat E-Finance Application", PR newswire, New York: Feb. 21, 2000.
Speakman, et al.; RFC 3208—PGM Reliable Transport Protocol Specification; www.faqs.org; 2001; pp. 1-72; RFC 3208; Network Working Group.
PCT Search Report and Written Opinion, Jun. 5, 2008; PCT Application No. PCT/EP2007/063194.
PCT Search Report and Written Opinion, Feb. 4, 2008; PCT Application No. PCT/EP2007/063239.
PCT Search Report and Written Opinion, Jul. 7, 2008; PCT Application No. PCT/EP2008/053370.
PCT Search Report and Written Opinion, Sep. 14, 2007; PCT Application No. PCT/EP2007/055851.
Office Action Dated Oct. 30, 2008 in U.S. Appl. No. 11/780,826.
Office Action Dated Mar. 19, 2009 in U.S. Appl. No. 11/559,425.
Office Action Dated May 6, 2009 in U.S. Appl. No. 11/559,434.
Office Action Dated May 8, 2009 in U.S. Appl. No. 11/586,076.
Office Action Dated Mar. 6, 2009 in U.S. Appl. No. 11/426,764.
Office Action Dated Feb. 6, 2009 in U.S. Appl. No. 11/567,898.
Office Action Dated Apr. 6, 2009 in U.S. Appl. No. 11/608,904.
Office Action Dated Apr. 14, 2009 in U.S. Appl. No. 11/780,826.
Office Action Dated May 27, 2009 in U.S. Appl. No. 11/426,857.
Office Action Dated Jun. 1, 2009 in U.S. Appl. No. 11/769,240.
Office Action Dated Feb. 24, 2009 in U.S. Appl. No. 11/609,696.
Office Action Dated May 20, 2009 in U.S. Appl. No. 11/426,819.
Office Action Dated Jun. 2, 2009 in U.S. Appl. No. 11/426,864.
Office Action Dated Jun. 22, 2009 in U.S. Appl. No. 11/769,243.
Office Action Dated Jun. 25, 2009 in U.S. Appl. No. 11/426,849.
Final Office Action, U.S. Appl. No. 11/609,604, Apr. 19, 2010.
Office Action, U.S. Appl. No. 11/609,708, Apr. 19, 2010.
Final Office Action, U.S. Appl. No. 11/609,708, Sep. 8, 2010.
Office Action, U.S. Appl. No. 11/426,789, Oct. 6, 2010.
Office Action, U.S. Appl. No. 11/567,357, May 27, 2010.
Final Office Action, U.S. Appl. No. 11/567,357, Oct. 27, 2010.
Final Office Action, U.S. Appl. No. 11/426,849, Aug. 17, 2010.
Office Action, U.S. Appl. No. 11/728,850, Jul. 27, 2010.
Notice of Allowance, U.S. Appl. No. 11/728,850, Nov. 22, 2010.

* cited by examiner

APPLICATION MESSAGE CONVERSION USING A FEED ADAPTER

BACKGROUND OF THE INVENTION

1. Field of the Invention

The field of the invention is data processing, or, more specifically, methods, apparatus, and products for application message conversion using a feed adapter.

2. Description of Related Art

Messaging environments are generally available to provide data communication between message sending devices and message receiving devices using application messages. An application message is a quantity of data organized into one or more data fields and is passed from a message producer installed on a message sending device to a message consumer installed on a message receiving device. An application message is a form of message recognized by application software operating in the application layer of a data communication protocol stack—as contrasted for example with a transport message or network message which are forms of messages recognized in the transport layer and the network layer respectively. An application message may represent, for example, numeric or textual information, images, encrypted information, and computer program instructions. In a financial market data environment, an application message is commonly referred to as a 'tick' and includes financial market data such as, for example, financial quotes or financial news. Financial quotes include bid and ask prices for any given financial security. A 'bid' refers to the highest price a buyer is willing to pay for a security. An 'ask' refers to the lowest price a seller is willing to accept for a security.

Often in messaging environments, message formats recognized by message sending devices are not recognized by message receiving devices. Such messaging environments typically include feed adapters that are capable of application message conversion. The basic task of the feed adapter is to receive an application message having an input message format from a message sending device, convert the application message having the input format to an application message having an output format, and transmit the application message having the output format to a message receiving device. In addition, feed adapters typically process information requests regarding data contained in the converted application messages from message receiving devices.

In current messaging environments, software architects typically configure feed adapters to perform application message conversion between only a fixed set of application message formats. This fixed set of application message formats is often hard-coded into a conversion module on the feed adapter. Any changes made to the application message formats or the configuration of a feed adapter typically require extensive recoding of the conversion module and subsequence recompilation of the new computer code. In fact, even slight modifications to current feed adapters often involve substantial financial and human resources. Readers will, therefore, appreciate that room for improvement exists for application message conversion using feed adapters.

SUMMARY OF THE INVENTION

Embodiments of the inventive subject matter generally include a method. The method includes receiving, at a feed adapter, an indication of a configuration policy of a plurality of configuration policies. The configuration policy of the plurality of configuration policies is selected based, at least in part, on said receiving the indication of the configuration policy of the plurality of configuration policies. The configuration policy of the plurality of configuration policies specifies a conversion rule from an input message format to an output message format using at least one conversion function of a plurality of conversion functions. The conversion rule specifies types of arguments that the at least one conversion function receives and returns. An application message having the input message format is received in the feed adapter. The application message having the input message format is converted by the feed adapter to an application message having the output message format according to the conversion rule specified by the configuration policy of the plurality of configuration policies.

DETAILED DESCRIPTION OF EXEMPLARY EMBODIMENTS

Figure 1:
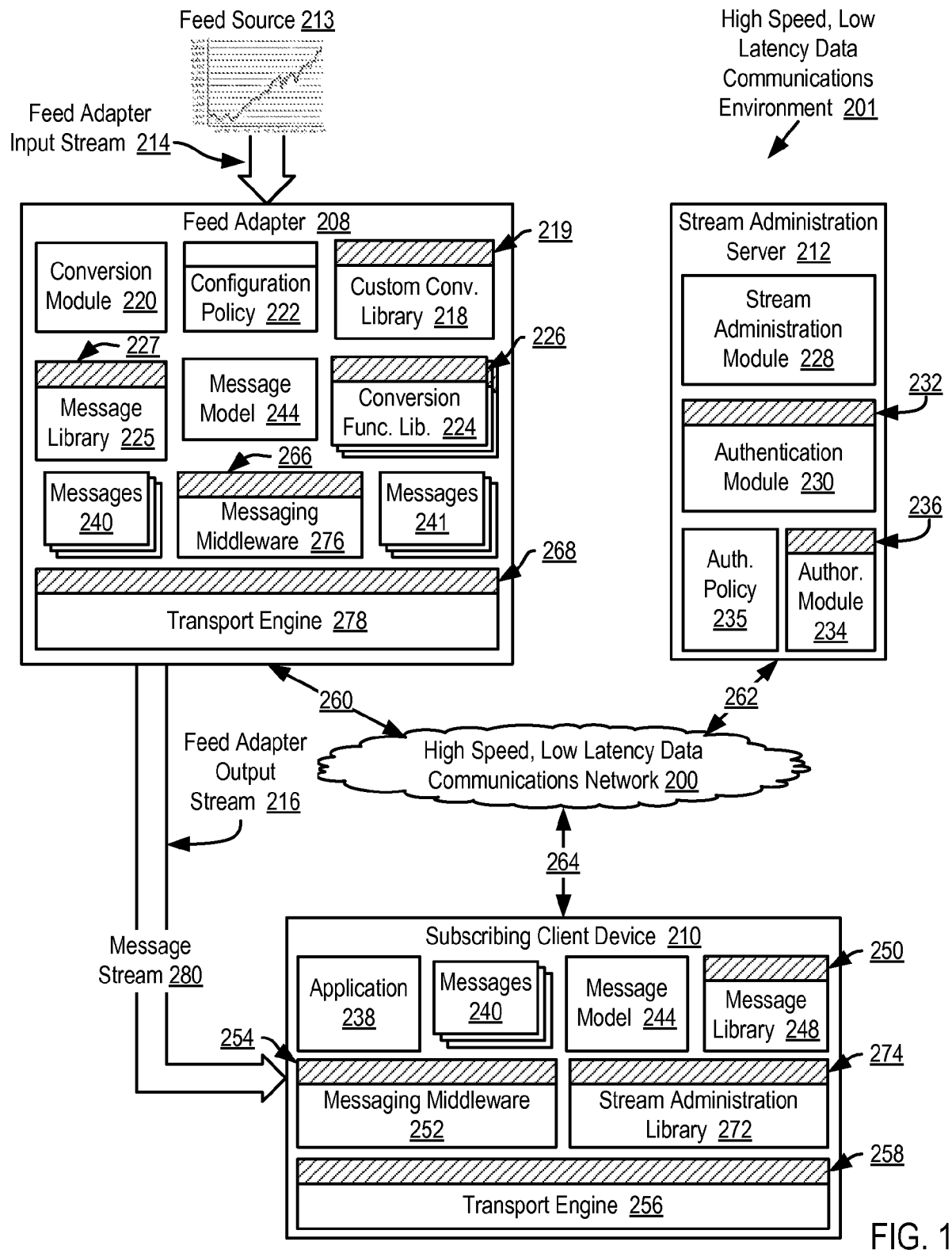
FIG. 1 sets forth a network and block diagram illustrating an exemplary computer data processing system for application message conversion using a feed adapter according to exemplary embodiments of the present invention.

Exemplary methods, apparatus, and products for application message conversion using a feed adapter according to embodiments of the present invention are described with reference to the accompanying drawings, beginning with FIG. 1. FIG. 1 sets forth a network and block diagram illustrating an exemplary computer data processing system for application message conversion using a feed adapter according to embodiments of the present invention. The system of FIG. 1 operates generally for application message conversion using a feed adapter according to embodiments of the present invention as follows: A feed adapter (208) capable of application message conversion is provided. The feed adapter (208) includes a plurality of conversion functions. Each conversion function is capable of converting data from one format to another format. A configuration policy (222) is established on the feed adapter (208). The configuration policy (222) specifies a conversion rule from an input message format to an output message format using at least one of the conversion functions. The feed adapter (208) receives an application message (241) having the input message format. The feed adapter (208) converts the application message (241) having the input message format to an application message (240) having the output message format according to the conversion rule of the configuration policy (222). The feed adapter (208) may also transmit the application message (240) having the output message format to a message receiving device on a message stream (280). In the example of FIG. 1, the message receiving device (210) is implemented as a subscribing client device.

The high speed, low latency data communications environment (201) illustrated in FIG. 1 includes a high speed, low latency data communications network (200). The network (200) includes a feed adapter (208), a stream administration server (212), and a subscribing client device (210), as well as the infrastructure for connecting such devices (208, 212, 210) together for data communications. The network (200) of FIG. 1 is termed 'high speed, low latency' because the application messages sent between devices connected to the network (200) on message streams administered by the stream administration server (212) bypass the stream administration server (212). For example, the application messages on the message stream (280) from the feed adapter (208) to the subscribing client device (210) bypass the stream administration server (212). Although such messages are not delayed for processing in the stream administration server (212), the stream administration server (212) retains administration of the stream (280) between devices connected to the high speed, low latency data communications network (200).

Further contributing to the 'high speed, low latency' nature of network (200), readers will note that the network (200) does not include a router, that is a computer networking device whose primary function is to forward data packets across a network toward their destinations. Rather, each device (208, 212, 210) provides its own routing functionality for data communication through a direct connection with the other devices connected to the network (200). Because the network (200) does not include a computer networking device dedicated to routing data packets, the network (200) of FIG. 1 may be referred to as a 'minimally routed network.' Although the exemplary network (200) illustrated in FIG. 1 does not include a router, such a minimally routed network is for explanation only. In fact, some high speed, low latency networks useful in application message conversion using a feed adapter according to embodiments of the present invention may include a router.

The high speed, low latency data communications environment (201) depicted in FIG. 1 includes a message stream (280). A message stream is a data communication channel between a communications endpoint of a sending device and a communications endpoint of at least one receiving device. A communications endpoint is composed of a network address and a port for a sending device, such as a feed adapter, or a receiving device, such as a subscribing client device. A message stream may be implemented as a multicast data communication channel. In a multicast data communication channel, a one-to-many relationship exists between a destination address for a message and the communication endpoints of receiving devices. That is, each destination address identifies a set of communication endpoints for receiving devices to which each message of the stream is replicated. A multicast data communication channel may be implemented using, for example, the User Datagram Protocol ('UDP') and the Internet Protocol ('IP'). In addition to a multicast data communication channel, the message stream may be implemented as a unicast data communication channel. In a unicast data communication channel, a one-to-one relationship exists between a destination address for a message and a communication endpoint of a receiving device. That is, each destination address uniquely identifies a single communication endpoint of single receiving device. A unicast data communication channel may be implemented using, for example, the Transmission Control Protocol ('TCP') and IP.

The exemplary system of FIG. 1 includes a stream administration server (212) connected to the high speed, low latency data communications network (200) through a wireline connection (262). The stream administration server (212) of FIG. 1 is a computer device having installed upon it a stream administration module (228), an authentication module (230), an authorization module (234), and an authorization policy (235). A stream administration module (228) is a software component that includes a set of computer program instructions configured for application message conversion using a feed adapter according to embodiments of the present invention. The stream administration module (228) operates generally for application message conversion using a feed adapter according to embodiments of the present invention by brokering establishment of a message stream (280) from the feed adapter (208) to the message receiving device (210). In addition, the stream administration module (228) administers the message stream by providing security services such as authenticating the subscribing client device (210) and authorizing the subscribing client device (210) to receive application messages from the feed adapter (208) on the message stream (280).

The authentication module (230) of FIG. 1 is a set of computer program instructions capable of providing authentication security services to the stream administration module (228) through an exposed authentication application programming interface ('API') (232). Authentication is a process of verifying the identity of an entity. In the exemplary system of FIG. 1, the authentication module (230) verifies the identity of the subscribing client device (210). The authentication module (230) may provide authentication security services using a variety of security infrastructures such as, for example, shared-secret key infrastructure or a public key infrastructure.

The authorization module (234) of FIG. 1 is a set of computer program instructions capable of providing authorization security services to the stream administration module (228) through an exposed authorization API (236). Authorization is a process of only allowing resources to be used by resource consumers that have been granted authority to use the resources. In the example of FIG. 1, the authorization module (234) identifies the application messages that the subscribing client device (210) is authorized to receive on the message stream (280). The authorization module (234) of FIG. 1 provides authorization security services using an authorization policy (235). The authorization policy (235) is a set of rules governing the privileges of authenticated entities to send or receive application messages on a message stream. In a financial market data environment, for example, an authenticated entity may be authorized to receive application messages that include financial quotes for some financial securities but not other securities. The authorization policy (235) may grant privileges on the basis of an individual entity or an entity's membership in a group.

In the exemplary system of FIG. 1, feed adapter (208) is connected to the high speed, low latency data communications network (200) through a wireline connection (260). The feed adapter (208) is a computer device having the capabilities of converting application messages (241) on a feed adapter input stream (214) having an input message format to application messages (240) on a feed adapter output stream (216) having an output message format and transmitting the application messages on the feed adapter output stream (216) to subscribing client devices. The feed adapter input stream (214) is a message stream from a feed source to the feed adapter (208). The feed adapter output stream (216) is a message stream administered by the stream administration server (212) from the feed adapter (208) to the subscribing client device (210).

In the example of FIG. 1, the feed adapter (208) receives application messages (241) having an input message format on the feed adapter input stream (214) from a feed source (213). The feed source (213) is a computer device capable of aggregating data into application messages and transmitting the messages to a feed adapter. In a financial market data environment, for example, a feed source (213) may be implemented as a feed source controlled by the Options Price Reporting Authority ('OPRA'). OPRA is the securities information processor for financial market information generated by the trading of securities options in the United States. The core information that OPRA disseminates is last sale reports and quotations. Other examples of feed sources in financial market data environment may include feed sources controlled by the Consolidated Tape Association ('CTA') or The Nasdaq Stock Market, Inc. The CTA oversees the dissemination of real-time trade and quote information in New York Stock Exchange and American Stock Exchange listed securities. The Nasdaq Stock Market, Inc. operates the NASDAQ Market Center$^{SM}$ which is an electronic screen-based equity securities market in the United States. In a financial market data environment, a feed adapter input stream is referred to as a 'financial market data feed.'

The feed adapter (208) of FIG. 1 has installed upon it a conversion module (220), a custom conversion library (218), a configuration policy (222), conversion function libraries (224), a message library (225), a message model (244), messaging middleware (276), and a transport engine (278). The conversion module (220) is a software component that includes a set of computer program instructions for providing basic feed adapter operation. The conversion module (220) of FIG. 1 initializes the feed adapter, loads common conversion function libraries, and loads the custom conversion library (218). The common conversion function libraries contain conversion functions that the feed adapter typically utilizes regardless of the feed sources providing application messages.

The custom conversion library (218) of FIG. 1 is a software component that includes computer program instructions for extending feed adapter functionality to utilize a particular feed source such as, for example, the feed source (213). The conversion module (220) utilizes the custom conversion library (218) through API (219) exposed by the custom conversion library (218). The custom conversion library (218) provides access the feed source (213), administers the feed adapter input stream (214) from the feed source (213), and performs application message conversion according to embodiments of the present invention. The custom conversion library (218) operates generally for application message conversion according to embodiments of the present invention by converting an application message (241) having the input message format to an application message (240) having the output message format according to the conversion rule of the configuration policy (222). To perform application message conversion, the custom conversion library (218) typically loads conversion functions libraries (224) specified in the configuration policy (222) and utilizes the conversion functions contained in those loaded libraries.

In the example of FIG. 1, the custom conversion library (218) may be implemented as a dynamically linked library available to the conversion module (220) at runtime, dynamically loaded Java classes, or any other implementation as will occur to those of skill in the art. Although the description above indicates that the functionality provided by the custom conversion library (218) is contained in a software module distinct from the conversion model (220), readers will note that features of both the conversion module (220) and the custom conversion library (218) may overlap or be combined into a single software module.

The configuration policy (222) of FIG. 1 is a data structure that specifies a conversion rule from an input message format to an output message format using at least one of the conversion functions of the conversion function libraries (224). A conversion rule is a data structure that contains a set of instructions for converting an application message from one format to another format. The custom conversion library (218) may perform the set of instructions contain in a conversion rule when conditions specified in the conversion rule are satisfied. Utilizing multiple conversion rules in a configuration policy (222), the custom conversion library (218) may convert messages from a variety of input formats to a variety of output formats. In the example of FIG. 1, the configuration policy (222) specifies a conversion rule for converting the application message (241) received from the feed adapter input stream (214) having an input format to application messages (240) having an output format for transmission to subscribing client devices on the feed adapter output stream (216).

In the example of FIG. 1, the configuration policy (222) is typically established on the feed adapter (208) by a system administrator. The configuration policy (222) may, however, be established on the feed adapter (208) by the stream administration server (212) when the message stream (280) is brokered, or be established on the feed adapter (208) by any other entity as will occur to those of skill in the art. The configuration policy (222) of FIG. 1 may be implemented using a structured document such as, for example, an eXtensible Markup Language ('XML') document. However, the custom conversion library (218) typically converts a configuration policy to a binary table for optimal runtime performance.

The conversion function libraries (224) of FIG. 1 are loadable software modules that each contain one or more conversion functions capable of converting data in an application message from one format to another format or converting values of data fields from one value to another value. The conversion functions contained in the conversion function libraries may, for example, convert a 16-bit integer to a 32-bit integer, convert a number stored in a string field to a 64-bit double floating point value, increase the value of one data field by one, or any other conversion as will occur to those of skill in the art. The custom conversion library (218) accesses the conversion functions through a set of conversion function APIs (226) exposed by the conversion functions of the conversion function libraries (224). In the example of FIG. 1, the conversion function libraries (224) may be implemented as dynamically linked libraries available to the custom conversion library (218) at runtime, dynamically loaded Java classes, or any other implementation as will occur to those of skill in the art.

In the exemplary system of FIG. 1, each conversion function in each of the conversion function libraries (224) has an argument signature. An argument signature specifies the order, number, and type of arguments that a particular conversion functions receives and returns. The argument signature of each function is stored in a table in the conversion function library (224) that contains the function.

The argument signatures are used by the custom conversion library (218) to determine whether the types of the arguments specified by a conversion rule for a particular conversion function match the argument signature of the particular conversion function. If the types of the arguments specified by a conversion rule for a particular conversion function do not match the argument signature of the particular conversion function, the custom conversion library (218) converts the types of the arguments specified by the conversion rule for the conversion function to match the argument signature of the conversion function.

In the example of FIG. 1, the application messages (240) have a format specified in the message model (244). The message model (244) is metadata that defines the structure and the format used to create, access, and manipulate the application messages (240) converted from the application messages (241) received from the feed source (213). Typically the same message model (244) is established on the feed adapter (208) and the subscribing client device (210) by the stream administration server (212) when the stream administration server (212) brokers the message stream (280) to the subscribing client device (210). A message model may be implemented using a structured document, such as, for example, an XML document, a Java object, C++ object, or any other implementation as will occur to those of skill in the art.

In the example of FIG. 1, the conversion module (220), the custom conversion library (218), and the conversion functions of the conversion function libraries (224) process the data contained in the application messages (240) using the message library (225). The message library (225) is a software module that includes a set of functions for creating, accessing, and manipulating messages (240) according to the message model (244). The message library (225) is accessible to the conversion module (220), the custom conversion library (218), and the conversion functions of the conversion function libraries (224) through a message API (227) exposed by the message library (225).

Before the custom conversion library (218) of FIG. 1 performs data processing on the application messages, the custom conversion library (218) receives application messages (241) having an input message format from the feed source (213). The custom conversion library (218) of FIG. 1 may receive the source stream messages through a receiving transport engine (not shown) of the feed adapter (208). The receiving transport engine is a software module that operates in the transport layer of the network stack and may be implemented according to the TCP/IP protocols, UDP/IP protocols, or any other data communication protocol as will occur to those of skill in the art. The receiving transport engine may provide the received application messages (241) directly to the custom conversion library (218) or to the messaging middleware (276), which in turn, provides the source stream messages to the custom conversion library (218).

The messaging middleware (276) of FIG. 1 is a software component that provides high availability services between the feed adapter (208), any backup feed adapter that may exist, the subscribing client device (210), and the feed source (213). After the custom conversion library (218) of FIG. 1 performs data processing on the application messages (241) received from the feed source (213), the messaging middleware (276) receives the application messages (240) having an output message format from the custom conversion library (218). The messaging middleware (276) then provides the received application messages (240) having the output message format to the transport engine (278) for transmission to a subscribing client device (210) on the message stream (280). The custom conversion library (218) interacts with the messaging middleware (276) through a messaging middleware API (266) exposed by the messaging middleware (276).

The transport engine (278) of FIG. 1 is a software component operating in the transport and network layers of the OSI protocol stack promulgated by the International Organization for Standardization. The transport engine (278) provides data communications services between network-connected devices. The transport engine may be implemented according to the UDP/IP protocols, TCP/IP protocols, or any other data communications protocols as will occur to those of skill in the art. The transport engine (278) is a software module that includes a set of computer program instructions for application message conversion according to embodiments of the present invention. The transport engine (278) operates generally for application message conversion according to embodiments of the present invention by transmitting application messages (240) having an output message format to a message receiving device (210) on the message stream (280). The messaging middleware (276) operates the transport engine (278) through a transport API (268) exposed by the transport engine (278). The transport engine (278) transmits the application messages (240) by encapsulating the application messages provided by the messaging middleware (276) into packets and transmitting the packets through the message stream (280) to the subscribing client device (210).

The subscribing client device (210) in exemplary system of FIG. 1 connects to the high speed, low latency data communications network (200) through a wireline connection (264). The subscribing client device (210) of FIG. 1 is a computer device capable of subscribing to the message streams transmitted by various feed adapters. In a financial market data environment, for example, a subscribing client device may subscribe to a tick to receive the bid and ask prices for a particular security on a message stream provided by a feed adapter controlled by a financial securities broker.

In the example of FIG. 1, the subscribing client device (210) has installed upon it an application (238), a message library (248), a message model (244), messaging middleware (252), a stream administration library (272), and a transport engine (256). The application (238) is a software component that processes data contained in the application messages (240) received from the feed adapter (208). The application (238) may process the data for utilization by the subscribing client device (210) itself, for contributing the data to another feed adapter, or for contributing the data to some other device. In a financial market data environment, the application installed on the subscribing client device may be a program trading application that buys or sells financial securities based on the quoted prices contained in ticks. The application may also be a value-adding application that contributes information to a tick such as, for example, the best bid and ask prices for a particular security, that is not typically included in the ticks provided by the feed source (213). The subscribing client device may then transmit the ticks to a feed adapter for resale to other subscribing client devices.

The application (238) processes the data contained in the application messages (240) using the message library (248). The message library (248) is software module that includes a set of functions for creating, accessing, and manipulating messages (240) according to a message model (244). The message library (248) is accessible to the application (238) through a message API (250) exposed by the message library (248). Similar to the message library (225) installed on the feed adapter (208), the message library (248) of FIG. 1 interprets the received application messages (240) using the message model (244). As mentioned above, the message model (244) is metadata that specifies the structure and the format for interpreting the application messages (240) received on the message stream (280).

The communications between the subscribing client device (210) and the stream administration server (212) may be implemented using a stream administration library (272). The stream administration library (272) is a set of functions contained in dynamically linked libraries, statically linked libraries, or dynamically loaded Java classes available to the application (238) through a stream administration library API (274). Through the stream administration library (272), the application (238) of the subscribing client device (210) may request to subscribe to messages from a feed adapter, modify an existing message subscription, or cancel a subscription. Functions of the stream administration library (272) used by the application (238) may communicate with the stream administration server (212) through network (200) by calling member methods of a CORBA object, calling member methods of remote objects using the Java Remote Method Invocation ('RMI') API, using web services, or any other communication implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ("IDL"), to describe an object's interface.

Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java™ Remote Method Invocation API is a Java application programming interface for performing remote procedural calls published by Sun Microsystems™. The Java™ RMI API is an object-oriented way of making remote procedure calls between Java objects existing in separate Java™ Virtual Machines that typically run on separate computers. The Java™ RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, the Java™ RMI allows a Java client to access a remote Java object just like any other local Java object.

Before the application (238) processes the data contained in the messages (240), the application (238) receives the messages (240) from the messaging middleware (252), which, in turn, receives the application messages (240) from the feed adapter (208) through the transport engine (256). The messaging middleware (252) is a software component that provides high availability services between the subscribing client device (210), the feed adapter (208), any backup feed adapters, and the stream administration module (212). In addition, the messaging middleware (252) provides message administration services for the stream administration server (212). Such message administration services may include restricting the ability of the application (238) to send and receive messages on a message stream to messages that satisfy certain constraints. The application (238) and the stream administration library (272) interact with the messaging middleware (252) through a messaging middleware API (254).

The transport engine (256) of FIG. 1 is a software component operating in the transport and network layers of the OSI protocol stack promulgated by the International Organization for Standardization. The transport engine (256) provides data communications services between network-connected devices. The transport engine may be implemented according to the UDP/IP protocols, TCP/IP protocols, or any other data communications protocols as will occur to those of skill in the art. The transport engine (256) is a software component that receives application message (240) from the feed adapter (208). The transport engine (256) receives the application messages (240) by receiving packets through the message stream (280) from the feed adapter (208), unencapsulating the application messages (240) from the received packets, and providing the application messages (240) to the messaging middleware (252). The messaging middleware (252) operates the transport engine (256) through a transport API (258) exposed by the transport engine (256).

The servers and other devices illustrated in the exemplary system of FIG. 1 are for explanation, not for limitation. Devices useful in application message conversion using feed adapters according to embodiments of the present invention may be implemented using general-purpose computers, such as, for example, computer servers or workstations, hand-held computer devices, such as, for example, Personal Digital Assistants ('PDAs') or mobile phones, or any other automated computing machinery configured for data processing according to embodiments of the present invention as will occur to those of skill in the art.

The arrangement of servers and other devices making up the exemplary system illustrated in FIG. 1 are for explanation, not for limitation. Although the connections to the network (200) of FIG. 1 are depicted and described in terms of wireline connections, readers will note that wireless connections may also be useful according to various embodiments of the present invention. Furthermore, data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Application message conversion using a feed adapter in accordance with the present invention in some embodiments may be implemented with one or more feed adapters, message receiving devices, and stream administration servers. These devices and servers are, in turn, implemented to some extent at least as computers, that is, automated computing machinery. For further explanation, therefore, FIG. 2 sets forth a block diagram of automated computing machinery comprising an exemplary feed adapter (208) useful in application message conversion using a feed adapter according to embodiments of the present invention. The feed adapter (208) of FIG. 2 includes at least one computer processor (156) or 'CPU' as well as random access memory (168) ('RAM') which is connected through a high speed memory bus (166) and bus adapter (158) to processor (156) and to other components of the feed adapter.

Stored in RAM (168) are a conversion module (220), custom conversion library (218), a configuration policy (222), conversion function libraries (224), application messages (240), application messages (241), a message model (244), message library (225), messaging middleware (276), and transport engine (278). Each application message (240, 241) is a quantity of data that includes one or more data fields and is transmitted from one device to another on a message stream. Application messages are typically created and processed by applications operating in application layers above the network and transport layers of a network protocol stack. As mentioned above, an application message may represent numeric or textual information, images, encrypted information, computer program instructions, and so on. In a financial market data environment, for example, a message is commonly referred to as a 'tick' and includes financial market data such as, for example, financial quotes or financial news. Each application message (240, 241) may be implemented using a structured document such as, for example, an XML document, a Java object, C++ object, or any other implementation as will occur to those of skill in the art. The message model (244) is metadata that defines the structure and format for creating and interpreting the application messages (240) having an output message format. The message model (244) may be implemented using a structured document such as, for example, an XML document, a Java object, C++ object, or any other implementation as will occur to those of skill in the art. The conversion module (220), the custom conversion library (218), the configuration policy (222), the conversion function libraries (224), the message library (225), the messaging middleware (276), and the transport engine (278) illustrated in FIG. 2 are software components, that is computer program instructions, that operate as described above with reference to FIG. 1 regarding the feed adapter.

Also stored in RAM (168) is an operating system (154). Operating systems useful in feed adapters according to embodiments of the present invention include UNIX™, Linux™, Microsoft NT™, IBM's AIX™, IBM's i5/OS™, and others as will occur to those of skill in the art. The operating system (154), the conversion module (220), the custom conversion library (218), the configuration policy (222), the conversion function libraries (224), the application messages (240), the application messages (241), the message model (244), the message library (225), the messaging middleware (276), and the transport engine (278) in the example of FIG. 2 are shown in RAM (168), but many components of such software typically are stored in non-volatile memory also, for example, on a disk drive (170).

Figure 2:
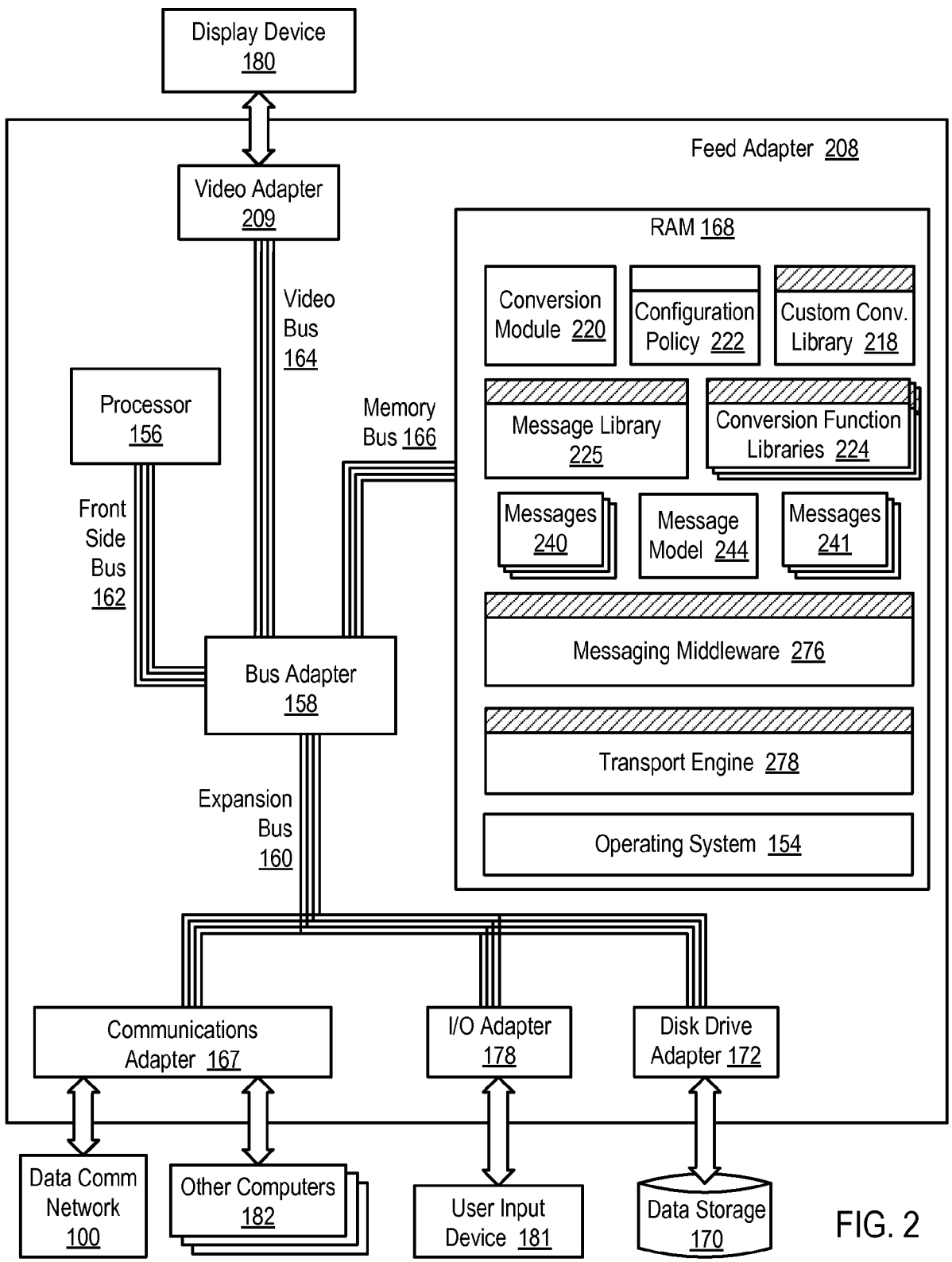
FIG. 2 sets forth a block diagram of automated computing machinery comprising an exemplary feed adapter useful in application message conversion using a feed adapter according to exemplary embodiments of the present invention.

The exemplary feed adapter (208) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in feed adapters useful according to embodiments of the present invention include the Intel Northbridge, the Intel Memory Controller Hub, the Intel Southbridge, and the Intel I/O Controller Hub. Examples of expansion buses useful in feed adapters useful according to embodiments of the present invention may include Peripheral Component Interconnect ('PCI') buses and PCI Express ('PCIe') buses.

The exemplary feed adapter (208) of FIG. 2 also includes disk drive adapter (172) coupled through expansion bus (160) and bus adapter (158) to processor (156) and other components of the exemplary feed adapter (208). Disk drive adapter (172) connects non-volatile data storage to the exemplary feed adapter (208) in the form of disk drive (170). Disk drive adapters useful in feed adapters include Integrated Drive Electronics ('IDE') adapters, Small Computer System Interface ('SCSI') adapters, and others as will occur to those of skill in the art. In addition, non-volatile computer memory may be implemented in a feed adapter as an optical disk drive, electrically erasable programmable read-only memory (so-called 'EEPROM' or 'Flash' memory), RAM drives, and so on, as will occur to those of skill in the art.

The exemplary feed adapter (208) of FIG. 2 includes one or more input/output ('I/O') adapters (178). I/O adapters in feed adapters implement user-oriented input/output through, for example, software drivers and computer hardware for controlling output to display devices such as computer display screens, as well as user input from user input devices (181) such as keyboards and mice. The exemplary feed adapter (208) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary feed adapter (208) of FIG. 2 includes a communications adapter (167) for data communications with other computers (182) and for data communications with a high speed, low latency data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for application message conversion using a feed adapter according to embodiments of the present invention include modems for wired dial-up communications, IEEE 802.3 Ethernet adapters for wired data communications network communications, and IEEE 802.11b adapters for wireless data communications network communications.

Although FIG. 2 is discussed with reference to exemplary feed adapters, readers will note that automated computing machinery comprising exemplary message receiving devices, such as, for example, subscribing client devices, and exemplary stream administration servers useful in application message conversion using a feed adapter according to embodiments of the present invention are similar to the exemplary feed adapter (208) of FIG. 2. That is, such exemplary stream administration servers and feed adapters include one or more processors, bus adapters, buses, RAM, video adapters, communications adapters, I/O adapters, disk drive adapters, and other components similar to the exemplary feed adapter (208) of FIG. 2 as will occur to those of skill in the art.

Figure 3:
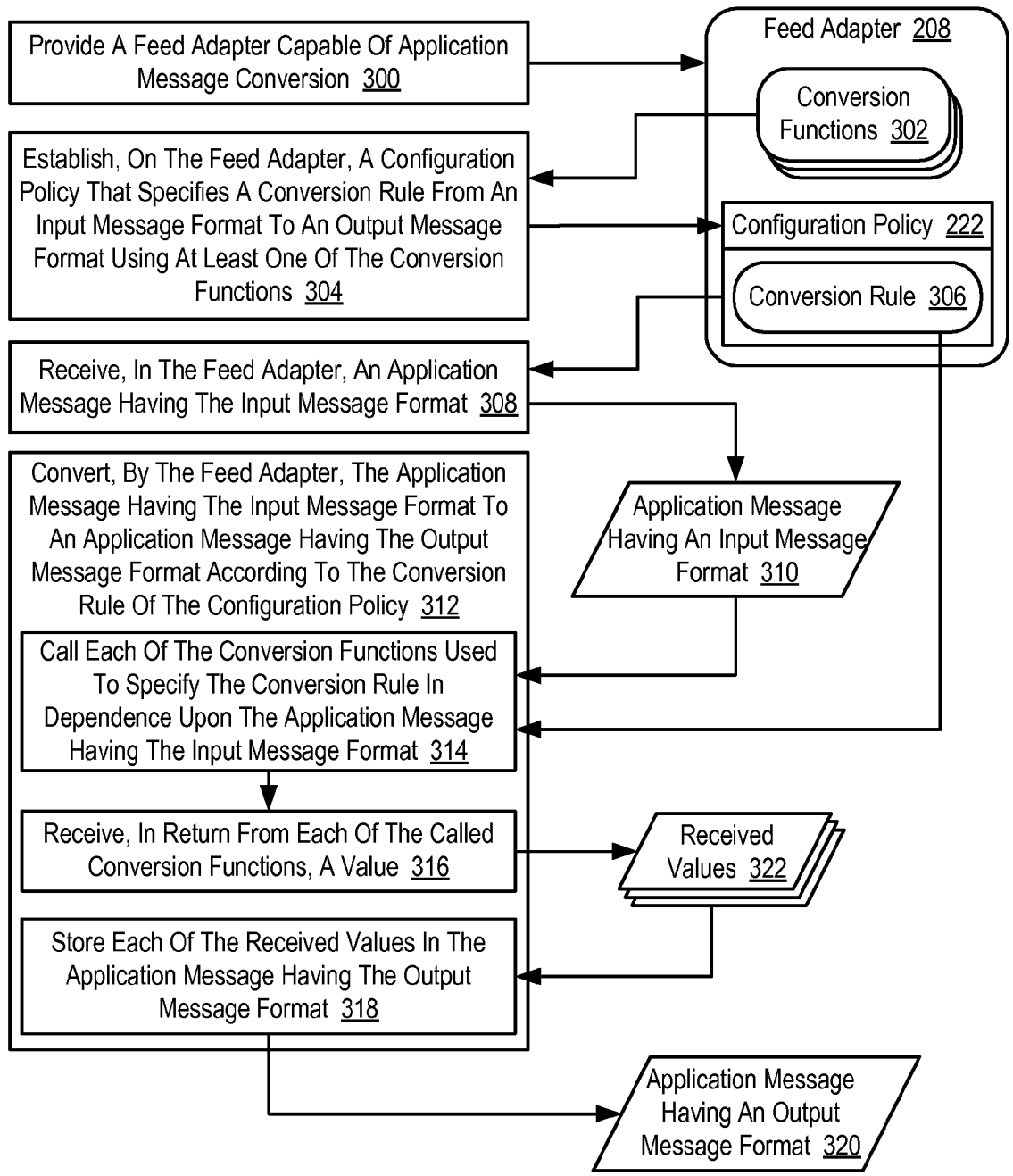
FIG. 3 sets forth a flowchart illustrating an exemplary method for application message conversion using a feed adapter according to exemplary embodiments of the present invention.

For further explanation, FIG. 3 sets forth a flowchart illustrating an exemplary method for application message conversion using a feed adapter according to embodiments of the present invention. The method of FIG. 3 includes providing (300) a feed adapter (208) capable of application message conversion. The feed adapter (208) of FIG. 3 includes a plurality of conversion functions (302). Each conversion function (302) is capable of converting data from one format to another format. As mentioned above, the conversion functions (302) may be contained in conversion function libraries that are loaded during the initialization of the feed adapter (208).

For additional explanation of the conversion functions (302), consider a set of exemplary conversion functions in a financial market data environment. Such exemplary conversion functions useful in application message conversion using a feed adapter according to embodiments of the present invention may include the following functions:

FMD_Symbol opraSymbol(opra_message*message);
    FMD_StrikePrice opraStrikePrice (opra_message*message);
    FMD_ExpireDate opraExpireDate (opra_message*message);
    FMD_Volume opraVolumn(opra_message*message); and
    FMD_SecurityType stringSecurityType(string security_type).

The exemplary conversion functions above may be used by a feed adapter to convert application messages having an OPRA format to application messages having a proprietary financial market data ('FMD') format. The exemplary function 'opraSymbol' receives a reference to an application message having the OPRA format, extracts the symbol for a financial security from the application message having the OPRA format, converts the symbol from an OPRA format to an FMD format, and returns the converted symbol having the FMD format to the calling application. The exemplary function 'opraStrikePrice' receives a reference to an application message having the OPRA format, extracts the strike price for a financial security from the application message having the OPRA format, converts the strike price from an OPRA format to an FMD format, and returns the converted strike price having the FMD format to the calling application. The exemplary function 'opraExpireDate' receives a reference to an application message having the OPRA format, extracts the expiration date for a financial security from the application message having the OPRA format, converts the expiration date from an OPRA format to an FMD format, and returns the converted expiration data having the FMD format to the calling application. The exemplary function 'opraVolume' receives a reference to an application message having the OPRA format, extracts the volume for a financial security from the application message having the OPRA format, converts the volume from an OPRA format to an FMD format, and returns the converted volume having the FMD format to the calling application. The exemplary function 'stringSecurityType' receives a string representing a type of financial security, converts the string to a security type having a FMD format, and returns the security type having the FMD format to the calling application. Readers will note that the exemplary conversion functions above are for explanation and not for limitation. Other conversion functions as will occur to those of skill in the art may also be useful in application message conversion according to embodiments of the present invention.

The method of FIG. 3 also includes establishing (304), on the feed adapter, a configuration policy (222). The configuration policy (222) is a data structure that specifies a conversion rule (306) from an input message format to an output message format using at least one of the conversion functions (302). The conversion rule (306) is a data structure that contains a set of instructions for converting an application message from one format to another format. Although the configuration policy (222) depicted in FIG. 3 includes only one conversion rule (306), readers will note that a configuration policy useful according to the present invention may include any number of conversion rules. In fact, a configuration policy according to the present invention often includes multiple conversion rules because the configuration policy may specify a specific conversion rule for each type of application message received from a feed source. In a financial market data environment, for example, the configuration policy may specify one conversion rule for a message containing quote data for a security and another conversion rule for a message containing sale data for a security. In the example of FIG. 3, the configuration policy (222) may be established (304) on the feed adapter (208) by a system administrator, by a stream administration server that brokers the establishment of a message stream from the feed adapter (208) to a message receiving device, or any other entity as will occur to those of skill in the art.

The configuration policy (222) of FIG. 3 may be implemented using a structured document such as, for example, an eXtensible Markup Language ('XML') document.

For optimal runtime performance, however, the feed adapter (208) typically converts a configuration policy to a binary table. For further explanation, consider an exemplary configuration policy useful in application message conversion using a feed adapter according to embodiments of the present invention in a financial market data environment. Such an exemplary configuration policy may be implemented in XML as follows:

```
1:  <configuration_policy>
2:      <load library="OPRA2FMD">
3:      <conversion_rule intype="Opra.Sale" outtype="FMD.Sale">
4:          <action field="FMD.Sequence">
5:              sequence( )
6:          </action>
7:          <action field="FMD.SecurityType">
8:              stringSecurityType("O")
9:          </action>
10:         <action field="FMD.Symbol">
11:             opraSymbol(&opraMessage)
12:         </action>
13:         <action field="FMD.ExpireDate">
14:             opraExpireDate(&opraMessage)
15:         </action>
16:         <action field="FMD.StrikePrice">
17:             opraStrikePrice(&opraMessage)
18:         </action>
19:         <action field="FMD.Volume">
20:             opraVolume(&opraMessage)
21:         </action>
22:         <action field="FMD.SalePrice">
23:             opraSalePrice(&opraMessage)
24:         </action>
25:         <action field="FMD.StrikePrice">
26:             opraStrikePrice(&opraMessage)
27:         </action>
28:         <action>
29:             routeMessage( )
30:         </action>
31:     </conversion_rule>
32: </configuration_policy>
```

In the example above, lines 1 and 32 contain markup tags that denote the beginning and the end, respectively, of the exemplary configuration policy. Line 2 of the exemplary configuration policy instructs a feed adapter to load the conversion function library identified as 'OPRA2FMD.' The OPRA2FMD conversion function library contains the function definitions for some of the conversion functions specified in the exemplary configuration policy above. In the example above, lines 3 and 31 contain markup tags that denote the beginning and the end, respectively, of an exemplary conversion rule specified by the exemplary configuration policy. The exemplary conversion rule specifies nine 'actions' to be performed by a feed adapter to convert an application message having an OPRA format to an application message having a FMD format when the feed adapter receives an application message having an OPRA format representing a sale on participating OPRA exchange. Each of the first eight actions specified in the exemplary conversion rule above instruct a feed adapter to execute a conversion function using an application message having an OPRA format and to store the return result in an application message having the FMD format. The last action specified in the conversion rule instructs a feed adapter to route the application message having the FMD format to the appropriate message receiving devices. Readers will note that the exemplary configuration policy above is for explanation and not for limitation. Other configuration policies as will occur to those of skill in the art may also be useful in application message conversion using a feed adapter according to embodiments of the present invention. Readers will also note that the XML implementation, the markup tags, and structure of the exemplary configuration policy above is also for explanation and not for limitation. Many other implementations, markup tags, or structures may be used to implement configuration policies useful according to embodiments of the present invention.

The method of FIG. 3 includes receiving (308), in the feed adapter, an application message (310) having the input message format. The feed adapter (208) may receive (308) the application message (310) having the input message format according to the method of FIG. 3 by receiving one or more transport packets from a feed source that includes the application message (310) having the input message format and unencapsulating the application message (310) from the received transport packets.

The method of FIG. 3 also includes converting (312), by the feed adapter, the application message (310) having the input message format to an application message (320) having the output message format according to the conversion rule (306) of the configuration policy (222). Converting (312) the application message (310) having the input message format to an application message (320) having the output message format according to method of FIG. 3 includes calling (314) each of the conversion functions (302) used to specify the conversion rule (306) in dependence upon the application message (310) having the input message format, receiving (316), in return from each of the called conversion functions, a value (322), and storing (318) each of the received values (322) in the application message (320) having the output message format. In the method of FIG. 3, calling (314) each of the conversion functions (302), receiving (316), in return from each of the called conversion functions, a value (322), and storing (318) each of the received values (322) in the application message (320) having the output message format may be carried out in a conversion module or a custom conversion library installed on the feed adapter (208).

In the example of FIG. 3, the input message format of the application message (310) includes one or more input field formats specifying the message fields in the application message (310). Similarly, the output message format of the application message (320) includes one or more output field formats specifying the message fields in the application message (320). To provide conversions between an input field format and an output field format, one of the conversion functions (302) of FIG. 3 is capable of converting data from the input field format to the output field format and returning the converted data having the output field format. For example, one of the conversion functions may be capable of converting a number stored in an ASCII text field format to a double precision number field format. In addition, one of the conversion functions (302) of FIG. 3 is capable of calculating a value in dependence upon the application message (310) having the input message format and returning the calculated value for storage in the application message (320) having the output message format. For example, consider a financial market data environment. In such an environment, one of the conversion functions may be capable of converting pence to pounds or converting pounds to pence.

After a feed adapter converts the application message having the input message format to an application message having the output message format, the feed adapter may transmit the application message having the output message format to a message receiving device. For further explanation, therefore, FIG. 4 sets forth a flowchart illustrating a further exemplary method for application message conversion using a feed adapter according to embodiments of the present invention that includes transmitting (402), by the feed adapter to a message receiving device on a message stream (280), the application message (320) having the output message format.

Figure 4:
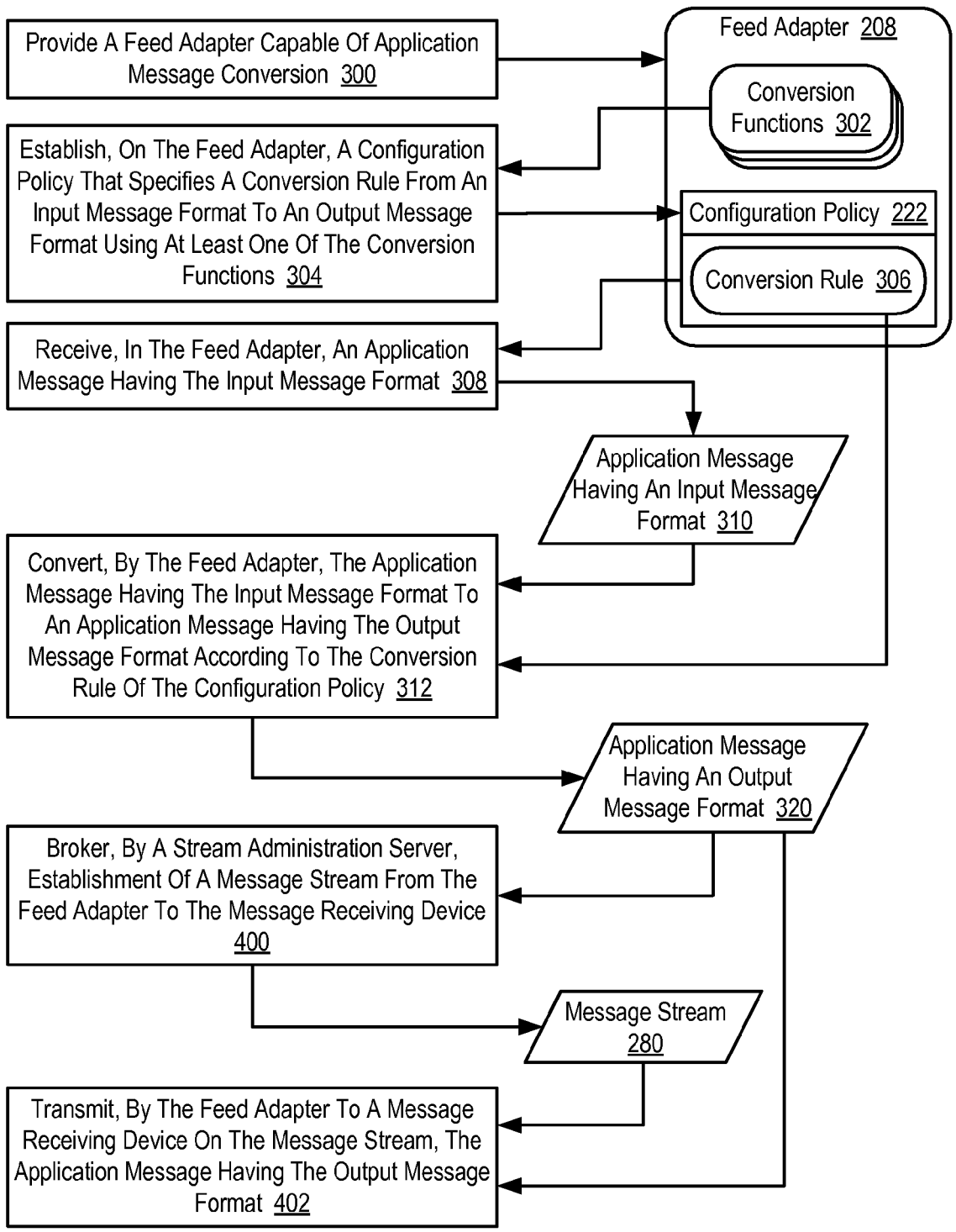
FIG. 4 sets forth a flowchart illustrating a further exemplary method for application message conversion using a feed adapter according to exemplary embodiments of the present invention.

The method of FIG. 4 is similar to the method of FIG. 3. That is, the method of FIG. 4 includes providing (300) a feed adapter (208) capable of application message conversion. The feed adapter (208) of FIG. 4 includes a plurality of conversion functions (302). Each conversion function (302) of FIG. 4 is capable of converting data from one format to another format. The method of FIG. 4 is also similar to the method of FIG. 3 in that the method of FIG. 4 includes establishing (304), on the feed adapter, a configuration policy (222) that specifies a conversion rule (306) from an input message format to an output message format using at least one of the conversion functions, receiving (308), in the feed adapter, an application message (310) having the input message format, and converting (312), by the feed adapter, the application message (310) having the input message format to an application message (320) having the output message format according to the conversion rule (306) of the configuration policy (222).

The method of FIG. 4 also includes brokering (400), by a stream administration server, establishment of the message stream (280) from the feed adapter (208) to the message receiving device. The message stream (280) of FIG. 4 represents a data communication channel between a communications endpoint of a message receiving device and a communications endpoint of the feed adapter (208). A message stream may be implemented as a multicast data communication channel using the UDP/IP protocols or a unicast data communication channel using TCP/IP protocols as discussed above with reference to FIG. 1.

Brokering (400), by a stream administration server, establishment of the message stream (280) from the feed adapter (208) to the message receiving device according to the method of FIG. 4 may be carried out by receiving a subscription request from a message receiving device to subscribe to messages from the feed adapter (208). The subscription request may be implemented as an XML document, a call to a member method of a RMI object on the message receiving device, or any other implementation as will occur to those of skill in the art. The subscription request may include topics of the messages that the message receiving device requests to receive from the feed adapter (208). A topic represents the characteristics of the messages that the message receiving device requests. Using a topic, a message receiving device may specify the group of messages for receipt from the feed adapter (208). In a financial market data environment, for example, a message receiving device may use a topic to request ticks from an OPRA feed source that contains quotes of an IBM option traded on the Chicago Board Options Exchange ('CBOE') that includes the best bid and best ask for the IBM option on the CBOE.

In the example of FIG. 4, brokering (400), by a stream administration server, establishment of the message stream (280) from the feed adapter (208) to the message receiving device may also include providing the message receiving device with a destination address for the feed adapter (208).

The destination address for the feed adapter (208) is a multicast address or a unicast address used by the message receiving device to listen for messages from the feed adapter (208). Using the destination address provided by the stream administration server, the message receiving device may establish the message stream (280) from the feed adapter (208) to the message receiving device.

Before the stream administration server provides the destination address for the feed adapter (208), the stream administration server in the example of FIG. 4 may perform several security services to ensure that the message receiving device only receives messages from the feed adapter (208) for which the message receiving device is authorized to receive. In the method of FIG. 4, brokering (400), by a stream administration server, establishment of the message stream (280) from the feed adapter (208) to the message receiving device may also be carried out by authenticating the message receiving device and authorizing the message receiving device to receive messages from the feed adapter (208) on the message stream (280). Authenticating the message receiving device may be carried out by verifying client security credentials provided by the message receiving device with the subscription request. The client security credentials may be implemented as a digital signature in a public key infrastructure, a security token, or any other security data as will occur to those of skill in the art for authenticating the identity of the originator of the subscription request. Authorizing the message receiving device to receive messages from the feed adapter (208) on the message stream (280) may be carried out by identifying the privileges associated with the authenticated message receiving device in dependence upon an authorization policy. An authorization policy is a set of rules governing the privileges of authenticated message receiving devices requesting to receive data from the feed adapter (208).

The method of FIG. 4 also includes transmitting (402), by the feed adapter (208) to a message receiving device on a message stream (280), the application message (320) having the output message format. The feed adapter (208) may transmit (402) the application message (320) having the output message format to a message receiving device on a message stream (280) according to the method of FIG. 4 by encapsulating the application message (320) into one or more transport packets and transmitting the transport packets through the message stream (280) to the message receiving device according to the UDP/IP protocols, TCP/IP protocols, or any other data communications protocols as will occur to those of skill in the art.

As mentioned above, each conversion function may have an argument signature that specifies the order, number, and type of arguments that the particular conversion function receives and returns. When the types of arguments specified by a conversion rule for a particular conversion function do not match the argument signature of the conversion function, the feed adapter may convert the types of the arguments specified by the conversion rule to match the argument signature of the conversion function. For further explanation, therefore, FIG. 5 sets forth a flowchart illustrating a further exemplary method for application message conversion using a feed adapter according to embodiments of the present invention that includes converting (510) types (506) of arguments specified by a conversion rule (306) for a conversion function (302) to match the argument signature (500) of the conversion function.

Figure 5:
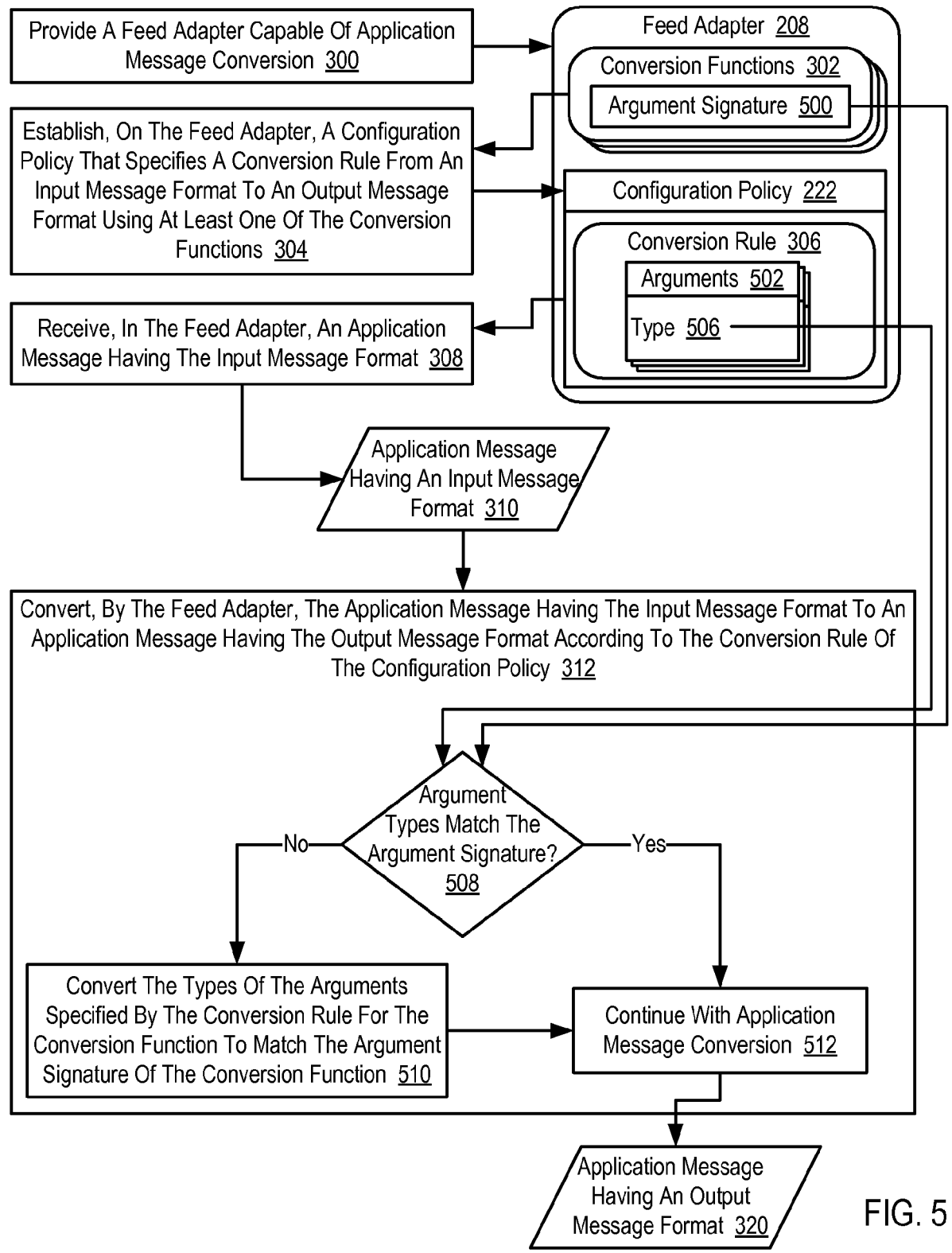
FIG. 5 sets forth a flowchart illustrating a further exemplary method for application message conversion using a feed adapter according to exemplary embodiments of the present invention.

The method of FIG. 5 is similar to the method of FIG. 3. That is, the method of FIG. 5 includes providing (300) a feed adapter (208) capable of application message conversion. The feed adapter (208) of FIG. 5 includes a plurality of conversion functions (302). Each conversion function (302) of FIG. 5 is capable of converting data from one format to another format. The method of FIG. 5 is also similar to the method of FIG. 3 in that the method of FIG. 5 includes establishing (304), on the feed adapter, a configuration policy (222) that specifies a conversion rule (306) from an input message format to an output message format using at least one of the conversion functions, receiving (308), in the feed adapter, an application message (310) having the input message format, and converting (312), by the feed adapter, the application message (310) having the input message format to an application message (320) having the output message format according to the conversion rule (306) of the configuration policy (222).

In the example of FIG. 5, each of the conversion functions (302) has an argument signature (500). The argument signature (500) of each function (302) specifies the order, number, and type of arguments that the conversion function receives and returns. The argument signature (500) of each function (302) of FIG. 5 may be stored in a function table in a conversion function library that contains the function.

The argument signature (500) may be stored in such a function table using codes to represent argument types. Examples of codes used to represent argument types in application message conversion using a feed adapter may include the following exemplary codes:

'I' to represent a 32-bit integer argument,
'L' to represent a 64-bit integer argument,
'F' to represent a 32-bit floating point number argument,
'D' to represent a 64-bit double floating point number argument,
'S' to represent a string argument,
'B' to represent a byte array argument,
'?' to represent any type of argument,
'V' to represent a variable argument, and
'v' to represent that no return argument is available.

Using combinations of the exemplary codes above, a feed adapter may represent the argument signature (500) of each conversion function (302) as entry in a function table of the conversion function library that contains the function. Examples of entries that may be used to represent the argument signatures (500) useful in application message conversion according to embodiments of the present invention may include the following entries:

S(B
L(IIII
F(D
v(?

The exemplary entry 'S(B' represents an argument signature for a conversion function that receives a byte array argument and returns a string argument. The exemplary entry 'L(IIII' represents an argument signature for a conversion function that receives four integer arguments and returns a 64-bit integer argument. The exemplary entry 'F(D' represents an argument signature for a conversion function that receives a 64-bit double floating point number argument and returns a 32-bit floating point number argument. The exemplary entry 'v(?' represents an argument signature for a conversion function that receives any type of argument and does not provide a return argument.

In the example of FIG. 5, the conversion rule (306) specifies one or more arguments (502) for one of the conversion functions (302). Each argument (502) of FIG. 5 has a type (506). For further explanation, consider again the exemplary conversion rule discussed above and reproduced below in part:

```
3:      <conversion_rule intype="Opra.Sale" outtype="FMD.Sale">
...         ...
7:          <action field= "FMD.SecurityType">
8:              stringSecurityType("O")
9:          </action>
...         ...
31:     </conversion_rule>
```

The exemplary conversion rule above species that the conversion function 'stringSecurityType' receives one argument and returns one argument. The argument received by the conversion function 'stringSecurityType' has a type that is a string. The string type of the argument received by the conversion function 'stringSecurityType' is specified in the example above using the quotation marks around the character 'O.' The argument returned by the conversion function 'stringSecurityType' has a type that is specified by the 'FMD.SecurityType' field. The field type of the 'FMD.SecurityType' field is the type of the argument returned by the conversion function 'stringSecurityType.'

In the method of FIG. 5, converting (312), by the feed adapter, the application message (310) having the input message format to an application message (320) having the output message format according to the conversion rule (306) of the configuration policy (222) includes determining (508) whether the types (506) of the arguments (502) specified by the conversion rule (306) for the conversion function match the argument signature (500) of the conversion function. Determining (508) whether the types (506) of the arguments (502) specified by the conversion rule (306) for the conversion function match the argument signature (500) of the conversion function according to the method of FIG. 5 may be carried out by parsing the conversion rule (306) to identify the conversion functions and the type of arguments for each of the identified functions, looking up the argument signature for each identified functions in the function libraries containing each identified function, and comparing each argument type for each identified function with the corresponding argument type specified in the argument signature for the function. If each argument type for each identified conversion function matches the corresponding argument type specified in the argument signature for the conversion function, then the types (506) of the arguments (502) specified by the conversion rule (306) for the conversion function match the argument signature (500) of the conversion function. The types (506) of the arguments (502) specified by the conversion rule (306) for the conversion function, however, do not match the argument signature (500) of the conversion function if any of the argument types for each identified conversion function do not match the corresponding argument type specified in the argument signature for the conversion function.

Converting (312), by the feed adapter, the application message (310) having the input message format to an application message (320) having the output message format according to the conversion rule (306) of the configuration policy (222) according to the method of FIG. 5 is carried out by continuing (512) with the application message conversion when if the types (506) of the arguments (502) specified by the conversion rule (306) for the conversion function match the argument signature (500). In the method of FIG. 5, continuing (512) with the application message conversion may be carried out by calling each of the conversion functions (302) used to specify the conversion rule (306) in dependence upon the application message (310) having the input message format, receiving, in return from each of the called conversion functions, a value, and storing each of the received values in the application message (320) having the output message format.

In the method of FIG. 5, converting (312), by the feed adapter, the application message (310) having the input message format to an application message (320) having the output message format according to the conversion rule (306) of the configuration policy (222) is carried out by converting (510) the types (506) of the arguments specified by the conversion rule (306) for the conversion function to match the argument signature (500) of the conversion function if the types (506) of the arguments (502) specified by the conversion rule (306) for the conversion function do not match the argument signature (500). Converting (510) the types (506) of the arguments specified by the conversion rule (306) for the conversion function to match the argument signature (500) of the conversion function may be carried out using standard type conversion algorithms as will occur to those of skill in the art. After the feed adapter converts (510) the types (506) of the arguments specified by the conversion rule (306) for the conversion function to match the argument signature (500) of the conversion function, the method of FIG. 5 continues (512) with application message conversion as discussed above.

In view of the explanations set forth above in this document, readers will recognize that application message conversion using a feed adapter according to embodiments of the present invention provides the following benefits:
  the ability to modify application message conversions performed by a feed adapter by only altering the feed adapter configuration policy,
  the ability to extend feed adapter functionality using loadable conversion function libraries, and
  the ability to reconfigure a feed adapter without recompiling the software installed on the feed adapter.

Exemplary embodiments of the present invention are described largely in the context of a fully functional computer system for application message conversion using a feed adapter. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   establishing, on a feed adapter, at least one configuration policy of a plurality of configuration policies and a message model, wherein said establishing at least one configuration policy of the plurality of configuration policies and the message model on the feed adapter comprises the feed adapter receiving, from a stream administration server, at least one of a first configuration policy of the plurality of configuration policies and the message model;
   receiving, at the feed adapter, an indication of a second configuration policy of the plurality of configuration policies;
   selecting, on the feed adapter, the second configuration policy of the plurality of configuration policies based, at least in part, on said receiving the indication of the second configuration policy of the plurality of configuration policies, wherein the second configuration policy of the plurality of configuration policies specifies a conversion rule from an input message format to an output message format using at least one conversion function of a plurality of conversion functions, wherein the conversion rule specifies types of arguments that the at least one conversion function receives and returns;
   receiving, in the feed adapter, an application message having the input message format;
   converting, by the feed adapter, the application message having the input message format to an application message having the output message format according to the conversion rule specified by the second configuration policy of the plurality of configuration policies.

2. The method of claim 1 wherein converting, by the feed adapter, the application message having the input message format to the application message having the output message format according to the conversion rule of the second configuration policy further comprises:
   calling at least one conversion function of the plurality of conversion functions specified by the conversion rule in dependence upon the application message having the input message format;
   receiving, in return from the at least one called conversion function of the plurality of conversion functions, a value; and
   storing the received value in the application message having the output message format.

3. The method of claim 1 wherein:
   the input message format comprises an input field format;
   the output message format comprises an output field format; and
   one of the plurality of conversion functions is capable of:
      converting data from the input field format to the output field format, and returning the converted data having the output field format.

4. The method of claim 1 wherein one of the plurality of conversion functions is capable of:
   calculating a value in dependence upon the application message having the input message format; and
   returning the calculated value.

5. The method of claim 1 further comprising transmitting, by the feed adapter to a message receiving device on a message stream, the application message having the output message format.

6. The method of claim 5 further comprising brokering, by a stream administration server, establishment of the message stream from the feed adapter to the message receiving device, wherein brokering establishment of the message stream from the feed adapter to the message receiving device comprises sending the indication of the second configuration policy of the plurality of configuration policies to the feed adapter.

7. The method of claim 5 wherein the message receiving device is a subscribing client device.

8. The method of claim 1 wherein the application message further comprises financial market data.

9. The method of claim 1, wherein each of the plurality of conversion functions has an argument signature, wherein said converting, by the feed adapter, the application message having the input message format to the application message having the output message format according to the conversion rule of the second configuration policy further comprises:
   determining whether the types of the arguments specified by the conversion rule for the at least one conversion function match the argument signature of the at least one conversion function; and
   converting the types of the arguments specified by the conversion rule for the at least one conversion function to match the argument signature of the at least one conversion function if the types of the arguments specified by the conversion rule for the at least one conversion function do not match the argument signature.

10. The method of claim 1, wherein at least one of the definition of the first configuration policy of the plurality of configuration policies and the definition of the message model comprises at least one of a structured language document, a binary object, a programming language data structure, a programming language class, and a programming language object.

11. An apparatus comprising: a computer processor; and a computer readable storage medium having computer usable program code embodied therewith, the computer usable program code executable by the processor to cause the apparatus to
   establish at least one configuration policy of a plurality of configuration policies and a message model, wherein said establishing at least one configuration policy of the plurality of configuration policies and the message model comprises receiving, from a stream administration server, at least one of a first configuration policy of the plurality of configuration policies and the message model;
   receive an indication of a second configuration policy of the plurality of configuration policies;
   select the second configuration policy of the plurality of configuration policies based, at least in part, on said receiving the indication of the second configuration policy of the plurality of configuration policies, wherein the second configuration policy of the plurality of configuration policies specifies a conversion rule from an input message format to an output message format using at least one conversion function of a plurality of conversion functions, wherein the conversion rule specifies types of arguments that the at least one conversion function receives and returns;
   receive an application message having the input message format;
   convert the application message having the input message format to an application message having the output message format according to the conversion rule specified by the second configuration policy of the plurality of configuration policies.

12. The apparatus of claim 11 wherein the computer usable program code executable by the processor to cause the processor to convert the application message having the input message format to the application message having the output message format according to the conversion rule of the second configuration policy comprises computer usable program code executable by the processor to cause the processor to:
   call at least one conversion function of the plurality of conversion functions specified by the conversion rule in dependence upon the application message having the input message format;
   receive, in return from-the at least one called conversion function of the plurality of conversion functions, a value; and
   store the received value in the application message having the output message format.

13. The apparatus of claim 11, wherein each of the plurality of conversion functions has an argument signature, wherein the computer usable program code executable by the processor to cause the apparatus to convert the application message having the input message format to the application message having the output message format according to the conversion rule of the second configuration policy comprises computer usable program code executable by the processor to cause the processor to:
   determine whether the types of the arguments specified by the conversion rule for the at least one conversion function match the argument signature of the at least one conversion function; and
   convert the types of the arguments specified by the conversion rule for the at least one conversion function to match the argument signature of the at least one conversion function if the types of the arguments specified by the conversion rule for the at least one conversion function do not match the argument signature.

14. A computer program product for application message conversion using a feed adapter, the computer program product disposed upon a non-transmission medium, the computer program product comprising computer usable program code configured to:
   establish at least one configuration policy of a plurality of configuration policies and a message model, wherein said establishing at least one configuration policy of the plurality of configuration policies and the message model comprises receiving, from a stream administration server, at least one of a first configuration policy of the plurality of configuration policies and the message model;
   receive an indication of a second configuration policy of the plurality of configuration policies;
   select the second configuration policy of the plurality of configuration policies based, at least in part, on said receiving the indication of the second configuration policy of the plurality of configuration policies, wherein the second configuration policy of the plurality of configuration policies specifies a conversion rule from an input message format to an output message format using at least one conversion function of a plurality of conversion functions each conversion function being capable of converting data from one format to another format;
   receive an application message having the input message format; and
   convert the application message having the input message format to an application message having the output message format according to the conversion rule specified by the second configuration policy of the plurality of configuration policies.

15. The computer program product of claim 14, wherein the computer usable program code configured to convert the application message having the input message format to an application message having the output message format according to the conversion rule of the second configuration policy comprises computer usable program code configured to:
   call at least one conversion function of the plurality of conversion functions specified by the conversion rule in dependence upon the application message having the input message format;
   receive, in return from the at least one called conversion function of the plurality of conversion functions, a value; and
   store the received value in the application message having the output message format.

16. The computer program product of claim 14, wherein the input message format comprises an input field format, wherein the output message format comprises an output field format, wherein at least one of the conversion functions of the plurality of conversion functions is capable of converting data from the input field format to the output field format and returning the converted data having the output field format.

17. The computer program product of claim 14, wherein at least one of the conversion functions is capable of calculating a value in dependence upon the application message having the input message format and returning the calculated value.

18. The computer program product of claim 14 further comprising computer usable program code configured to transmit to a message receiving device, on a message stream, the application message having the output message format.

19. The computer program product of claim 14, wherein each of the plurality of conversion functions has an argument signature, wherein the computer usable program code configured to convert the application message having the input message format to the application message having the output message format according to the conversion rule of the second configuration policy is configured to:
   determine whether the types of the arguments specified by the conversion rule for the at least one conversion function match the argument signature of the at least one conversion function; and
   convert the types of the arguments specified by the conversion rule for the at least one conversion function to match the argument signature of the at least one conversion function if the types of the arguments specified by the conversion rule for the at least one conversion function do not match the argument signature.

* * * * *